United States Patent Office 3,062,836
Patented Nov. 6, 1962

3,062,836
METHOD OF PREPARING β-LACTONES OF 2,2,4,4-TETRAALKYL-3-HYDROXY-3-BUTENOIC ACIDS BY CATALYZED REACTION OF DIALKYL-KETENES
James C. Martin, Kingsport, Tenn., assignor to Eastman Kodak Company, Rochester, N.Y., a corporation of New Jersey
No Drawing. Filed May 9, 1961, Ser. No. 108,738
9 Claims. (Cl. 260—343.9)

This invention relates to a novel method for preparing certain unsaturated β-lactones. More particularly, it relates to a method of preparing the β-lactones of 2,2,4,4-tetraalkyl-3-hydroxy-3-butenoic acids by the reaction of dialkylketenes in the presence of a Lewis acid as a catalyst.

The production of unsaturated β-lactones by the method of the invention is illustrated by the following equation:

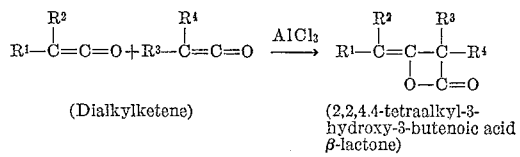

(Dialkylketene)    (2,2,4,4-tetraalkyl-3-hydroxy-3-butenoic acid β-lactone)

wherein $R^1$, $R^2$, $R^3$ and $R^4$ are the same or different alkyl radicals of from 1 to 4 carbon atoms.

Lactones of the above type are valuable intermediates in the preparation of a number of useful products. For example, when contacted with a strongly basic catalyst such as sodium methoxide in a solvent such as ether or benzene they form useful crystalline polymers. They are also useful as intermediates in the preparation of valuable allenic compounds. For instance, tetramethyl allene is produced in good yield by pyrolysis of 2,2,4-trimethyl-3-hydroxy-3-pentenoic acid β-lactone at a temperature, e.g., of 450° C. Still further, the lactones are useful starting materials in the preparation of tetraalkyl-acetoacetic esters by reaction with a hydroxyl compound such as methanol. As chemical reagents or intermediates the lactones of my invention have important advantages over the previously known dialkylketene dimers, i.e., the tetraalkyl-1,3-cyclobutanediones. For example, while tetramethyl-1,3-cyclobutanedione is a volatile, easily sublimed solid, the isomeric lactone is a liquid at normal temperature and pressure and is, therefore, much more convenient to employ as a reagent.

These lactones are disclosed as novel compounds in the copending U.S. patent application of Edward U. Elam entitled "Unsaturated β-Lactones and Method of Preparing Them," S.N. 108,740, filed on the same day as the present application. Elam discloses a method of preparation in which a dialkylketene is contacted with a strongly basic polymerization catalyst such as an alkali metal alkoxide in an inert solvent to obtain a solid polymer. This polymer is then decomposed by pyrolysis to yield a 2,2,4,4-tetraalkyl-3-hydroxy-3-butenoic acid β-lactone. The method disclosed by Elam is a valuable method for producing the lactones but I have developed another method whereby lactones of this type can be obtained by the catalytic conversion of dialkylketenes without the necessity of forming and decomposing a solid polymer.

The method of my invention, in general, comprises contacting a dialkylketene, of which the alkyl groups have from 1 to 4 carbon atoms, with a catalytic amount of a Lewis acid such as aluminum chloride and recovering a reaction product comprising a 2,2,4,4-tetraalkyl-3-hydroxy-3-butenoic acid β-lactone of which the alkyl groups have from 1 to 4 carbon atoms. (The term "Lewis acid" is used herein to designate an aprotonic acid of the Lewis type and is described more fully hereinafter.)

In preferred modifications of the method the reaction is carried out in the presence of a solvent having a high dielectric constant and at a temperature in the range of 50–150° C.

It is known in the art that dialkylketenes react with themselves, spontaneously in the case of the lower members such as dimethylketene, to form tetraalkyl-1,3-cyclobutanediones. ("Organic Reactions," R. Adams, editor, John Wiley and Sons, N.Y., 1946, vol. III, chap 3, Hanford and Sauer, "Preparation of Ketenes and Ketene Dimers"). In contrast to this known reaction I have discovered that in the presence of an aprotonic Lewis acid the dialkylketenes can be caused to react with themselves to form 2,2,4,4-tetraalkyl-3-hydroxy-3-butenoic acid β-lactones. The structure of the lactone product obtained by my novel method has been established by three analytical methods: (1) elementary analysis, (2) infrared spectroscopy, and (3) nuclear magnetic resonance spectroscopy.

The starting materials for producing lactones of the formula,

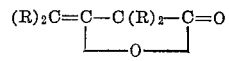

by the method of my invention are disubstituted ketenes of the structure,

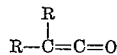

wherein the substituents, R, are alkyl groups of 1 to 4 carbon atoms or are alkylene groups which, with the carbon atom to which they are attached, form a 5 or 6 membered saturated carbocyclic ring. Examples include, dimethylketene, ethylmethylketene, diethylketene, butylethylketene, di-n-propylketene, diisobutylketene, di-n-butylketene and carbocyclic ketenes such as tetramethyleneketene and pentamethyleneketene. For convenience, I use the term dialkylketene to designate all of such disubstituted ketenes. The dialkylketenes can be prepared by the method described in copending application of R. H. Hasek and E. U. Elam, S.N. 841,961, filed September 24, 1959.

The reaction can be carried out in the absence of a solvent but preferably is carried out in the presence of a solvent. The use of a solvent facilitates contact between the catalyst and the starting material and aids in temperature control. The solvent should be inert or at least should not react rapidly with the dialkylketene or the product and should not inactivate the catalyst. Suitable solvents include, for example, aliphatic and aromatic hydrocarbons, chlorinated aliphatic and aromatic hydrocarbons, esters, dimethylformamide, dimethylacetamide, dimethylsulfoxide, etc. A particularly good solvent is the 2,2,4,4-tetraalkyl-3-hydroxy-3-butenoic acid β-lactone itself.

My work indicates that the rate of reaction in the method of the invention is dependent at least in part on the dielectric constant of the solvent. For instance, the reaction rate appears to be higher when the solvent is acetonitrile (high dielectric constant) than when the solvent is chloroform, which has a considerably lower dielectric constant. With the lower dialkylketenes the rate is quite rapid even in solvents such as chloroform. However, based on the discovery that the rate of reaction is influenced by the nature of the solvent, a preferred embodiment of the method, particularly when the starting material is a dialkylketene of which the alkyl groups have at least 3 carbon atoms, comprises carrying out the reaction in the presence of an inert solvent having a dielectric constant, measured at 20° C. using a frequency of from 20 to 20,000 cycles per second, of at least 10.

The reaction can be carried out in the absence of a solvent simply by mixing the Lewis acid with the dialkylketene. If no solvent is used the purification of the product is simplified.

The molar ratio of the Lewis acid to the dialkylketene can vary from about 0.01 to 0.5:1. The higher ratios give no particular advantage over the lower ones except in overcoming the effect of small concentrations of protonic contaminants.

The dimerization of the lower dialkylketenes in the presence of an aprotonic Lewis acid is quite exothermic and extensive cooling is needed to avoid excessive temperatures. The reaction can be carried out at temperatures as low as room temperature but for satisfactory reaction rate the temperature should be at least about 40° C. Preferably, the temperature is about 50 to 80° C. for reacting the lower dialkylketenes (i.e., $C_1$-$C_2$ alkyl groups) although higher temperatures are satisfactory. For the higher dialkylketenes, i.e., $C_3$-$C_4$ alkyl groups, the preferred reaction temperature is 60 to 150° C. Temperatures above about 175° C. are less satisfactory because pressure vessels are required if the temperature is above the boiling point of the product. Temperatures as high as about 300° C. can be used but higher temperatures should be avoided so as to avoid decomposing the lactone product.

The time of reaction depends upon the particular Lewis acid employed and the reaction temperature. With a high temperature and a strong Lewis acid, the reaction is complete within a few minutes. With low temperature or a weak Lewis acid the time required may vary from a few hours to several weeks.

As I have indicated, the present invention is based on my discovery that aprotonic acids of the Lewis type catalyze the conversion of dialkylketenes to 2,2,4,4-tetraalkyl-3-hydroxy-3-butenoic acid β-lactones. As defined by G. N. Lewis, ["Valence and the Structure of Atoms and Molecules," Chemical Catalogue Co., N.Y., 1923; J. Franklin Inst. 226, 243 (1938)] an acid is a substance that can accept a pair of electrons from another substance to form a chemical bond. Lewis' broad definition includes substances that are proton donors, such as hydrochloric acid, and substances that accept electrons but do not furnish protons, for instance, boron trifluoride. Acids that donate protons are designated as protonic. Those that merely accept electrons but do not donate protons are called aprotonic.

The latter type of acids is referred to in this specification as an "aprotonic Lewis acid" or simply as a "Lewis acid." I use these terms to distinguish from the protonic acids or so-called Brönsted acids. Only aprotonic Lewis acids are suitable in the method of the invention. Protonic acids are unsuitable. They either fail to achieve conversion of the dialkylketene or cause the formation of products other than the desired lactones. Certain solvents are also unsuitable because they have an available proton. Such unsuitable solvents include water, alcohols and amines. However, the presence of a small amount of an unsuitable solvent such as water in a satisfactory solvent such as heptane can be overcome by the use of a sufficient amount of the anhydrous Lewis acid.

A large number of the described aprotonic acids of the Lewis type as used in the method of the invention are available. They include such materials as boron trifluoride, silicon tetrachloride, phosphorous pentoxide, sulfur dioxide, aluminum chloride, antimony pentachloride, ferric chloride, stannic chloride, boron trifluoride, titanium tetrachloride, zinc bromide, zinc chloride, etc. The well-known Friedel-Crafts catalysts, a number of which are mentioned, comprise a class of aprotonic Lewis acids that are particularly valuable as catalysts in the method of my invention.

Further understanding of the invention can be obtained from the examples following, which illustrate certain principles of the invention. The first example demonstrates the conversion of dimethylketene to 2,2,4-trimethyl-3-hydroxy-3-butenoic acid β-lactone, using aluminum chloride as the Lewis acid catalyst and using the lactone product as the reaction solvent.

*Example 1.*—To a stirred solution of 3 g. of aluminum chloride in 82 g. of 2,2,4-trimethyl-3-hydroxy-3-pentenoic acid, β-lactone under nitrogen was added 70 g. of dimethylketene. The reaction was quite exothermic and the temperature was kept in the range 40–70° C. by an ice bath around the reaction vessel. The reaction was over in a few minutes, but the stirring was continued for an additional hour. The reaction solution was examined by gas chromatography. The chromatogram contained only one peak; this was identified as 2,2,4-trimethyl-3-hydroxy-3-pentenoic acid, β-lactone. Distillation through a 6-in. Vigreux column gave 145 g. of 2,2,4-trimethyl-3-hydroxy-3-pentenoic acid β-lactone, B.P. 83–85° C. (40 mm.), $n_D^{20}$ 1.4381. *Analysis.*—Calcd. for $C_8H_{12}O_2$: C, 68–5; H, 8.6; sapon. equiv., 142.2. Found: C, 68.4; H, 8.7; sapon. equiv., 140.0.

The next example demonstrates that a Brönsted or protonic acid will not catalyze the conversion of dimethylketene to 2,2,4-trimethyl-3-hydroxy-3-pentenoic acid β-lactone.

*Example 2.*—To a stirred solution of 1 g. of p-toluenesulfonic acid in 125 ml. of chloroform was added 40 g. of dimethylketene. The solution was stirred for several hours until all of the dimethylketene had reacted. Examination of the reaction solution by gas chromatography showed only chloroform and tetramethyl-1,3-cyclobutanedione.

The following example demonstrates that with no catalyst present, dimethylketene was converted to the normal dimer, tetramethyl-1,3-cyclobutanedione.

*Example 3.*—40 g. of dimethylketene was added to 125 ml. of chloroform as described in Example 2. All of the dimethylketene was converted to tetramethyl-1,3-cyclobutanedione, as determined by gas chromatography.

The next example demonstrates successful practice of the method of the invention, using the same solvent, i.e., chloroform, as used in the unsuccessful operations of Examples 2 and 3.

*Example 4.*—To a stirred solution of 1 g. of aluminum chloride in 125 ml. of chloroform was added 40 g. of dimethylketene. An immediate, exothermic reaction took place, causing the chloroform to reflux. The reaction was complete in a few minutes. Examination of the reaction solution by gas chromatography showed only chloroform and 2,2,4-trimethyl-3-hydroxy-3-pentenoic acid β-lactone.

The following example demonstrates the method of the invention, using a different dialkylketene as the starting material.

*Example 5.*—To a stirred solution of 2 g. of aluminum chloride in 200 ml. of chloroform was added slowly 68 g. of ethylmethylketene. An immediate, exothermic reaction took place causing the chloroform to reflux. Examination of the reaction solution by gas chromatography showed only chloroform and one other peak. Subsequent distillation yielded a liquid, B.P. 82.84° (11 mm.), $n_D^{20}$ 1.4448, identified as 2,4-dimethyl-2-ethyl-3-hydroxy-3-hexenoic acid β-lactone.

The next example demonstrates the use of still another dialkylketene, namely, butylethylketene, as the starting material in the method of the invention and the use of the lactone product as the reaction solvent.

*Example 6.*—To a stirred solution of 2 g. of stannic chloride in 100 g. of 2-butyl-2,4-diethyl-3-hydroxy-3-octenoic acid β-lactone at 100° C. was added 63 g. of butylethylketene. The temperature was kept in the range 100–120° C. for 15 min. Distillation through a 6-in. Vigreux column gave 141 g. of 2-butyl-2,4-diethyl-3-hydroxy-3-octenoic acid β-lactone, B.P. 104–106° C. (3 mm.).

The next example demonstrates the use in the method of the invention of a preferred type of reaction solvent having a high dielectric constant.

*Example 7.*—To a refluxing solution of 2.5 g. of titanium tetrachloride in 200 ml. of acetonitrile was added 120 g. of diethylketene. Distillation of the reaction mixture gave 91.2 g. of 2,2,4-triethyl-3-hydroxy-3-hexenoic acid β-lactone.

Although the invention has been described in considerable detail with reference to certain preferred embodiments thereof, it will be understood that variations and modifications can be effected within the spirit and scope of the invention as described hereinabove and as defined in the appended claims.

I claim:
1. The method which comprises contacting with a catalytic amount of an aprotonic Lewis acid a disubstituted ketene of the structure,

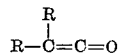

wherein the substituents, R, are selected from the group consisting of alkyl groups of from 1 to 4 carbon atoms and alkylene groups which, together with the carbon atom to which they are attached, form a saturated carbocyclic ring of 5 to 6 carbon atoms, and recovering as product a lactone of the structure,

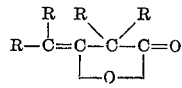

2. The method of preparing a 2,2,4,4-tetraalkyl-3-hydroxy-3-butenoic acid β-lactone which comprises contacting with a catalytic amount of an aprotonic Lewis acid a dialkylketene of which the alkyl groups have from 1 to 4 carbon atoms at a temperature of about 40 to 300° C. and recovering such lactone as product.

3. The method of preparing a 2,2,4,4-tetraalkyl-3-hydroxy-3-butenoic acid β-lactone which comprises forming a mixture consisting essentially of dialkylketene of which the alkyl groups have from 1 to 4 carbon atoms and a catalytic amount of an aprotonic Lewis acid, maintaining the reaction mixture at a temperature of about 40 to 300° C., distilling the resulting reaction product and recovering a distillate comprising said lactone.

4. The method of preparing a 2,2,4,4-tetraalkyl-3-hydroxy-3-butenoic acid β-lactone which comprises forming a reaction mixture comprising a dialkylketene of which the alkyl groups have from 1 to 4 carbon atoms, an inert solvent, and an aprotonic Lewis acid in the amount of 0.01 to 0.5:1 mol per mol of dialkylketene, maintaining said reaction mixture at a temperature of about 40 to 300° C. and recovering a reaction product comprising said lactone.

5. The method which comprises forming a reaction mixture of dimethylketene and a catalytic amount of aluminum chloride, maintaining the reaction mixture at a temperature of about 50 to 80° C. and recovering a reaction product comprising 2,2,4-trimethyl-3-hydroxy-3-pentenoic acid β-lactone.

6. The method which comprises forming a reaction mixture of methylethylketene and a catalytic amount of aluminum chloride, maintaining the reaction mixture at a temperature of about 50 to 80° C. and recovering a reaction product comprising the β-lactone of 2,4-dimethyl-2-ethyl-3-hydroxy-3-hexenoic acid.

7. The method of preparing 2,2,4-trimethyl-3-hydroxy-3-butenoic acid β-lactone which comprises forming a reaction mixture comprising dimethylketene, said lactone and a catalytic amount of an aprotonic Lewis acid, maintaining the reaction mixture at a temperature of about 50 to 150° C. and recovering a reaction product comprising said lactone.

8. The method which comprises forming a reaction mixture of a dialkylketene, of which the alkyl groups have from 3 to 4 carbon atoms, a catalytic amount of an aprotonic Lewis acid and an inert solvent having a dielectric constant, measured at 20° C. using a frequency of from 20 to 20,000 cycles per second, of at least 10, maintaining the reaction mixture at a temperature of about 60 to 150° C. and recovering a reaction product comprising a 2,2,4,4-tetraalkyl-3-hydroxy-3-butenoic acid β-lactone of which the alkyl groups have 3 to 4 carbon atoms.

9. The method of preparing a 2,2,4,4-tetraalkyl-3-hydroxy-3-butenoic acid β-lactone which comprises contacting with an aprotonic Friedel-Crafts catalyst a dialkylketene of which the alkyl groups have from 1 to 4 carbon atoms at a temperature of about 40 to 300° C. and recovering such lactone as product.

References Cited in the file of this patent

Adams (Ed.): Organic Reactions, John Wiley and Sons, New York (1946), page 127.